United States Patent
Chan

(10) Patent No.: US 9,483,136 B2
(45) Date of Patent: Nov. 1, 2016

(54) TOUCH PANEL

(71) Applicant: WINSKY TECHNOLOGY LIMITED, Hong Kong (HK)

(72) Inventor: Winston Chan, Hong Kong (HK)

(73) Assignee: WINSKY TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 14/493,005

(22) Filed: Sep. 22, 2014

(65) Prior Publication Data

US 2015/0009433 A1 Jan. 8, 2015

Related U.S. Application Data

(62) Division of application No. 13/046,365, filed on Mar. 11, 2011, now Pat. No. 9,256,094.

(30) Foreign Application Priority Data

Mar. 25, 2010 (TW) .............................. 99109030 A

(51) Int. Cl.
*G06F 3/044* (2006.01)
*G02F 1/1343* (2006.01)
*G06F 3/041* (2006.01)
*G02F 1/1333* (2006.01)
*G02F 1/1335* (2006.01)

(52) U.S. Cl.
CPC ......... *G06F 3/0412* (2013.01); *G02F 1/13338* (2013.01); *G02F 1/13439* (2013.01); *G02F 1/133526* (2013.01); *G02F 1/133528* (2013.01); *G06F 3/044* (2013.01); *G06F 2203/04103* (2013.01)

(58) Field of Classification Search
None
See application file for complete search history.

(56) References Cited

U.S. PATENT DOCUMENTS

| 5,568,292 | A | 10/1996 | Kim |
| 6,259,490 | B1 | 7/2001 | Colgan et al. |
| 6,765,629 | B1 | 7/2004 | Jeong et al. |
| 7,924,388 | B2 | 4/2011 | Abe |
| 2008/0252614 | A1 | 10/2008 | Tatehata et al. |

(Continued)

FOREIGN PATENT DOCUMENTS

| CN | 1441295 | 9/2003 |
| CN | 101504501 | 8/2009 |

(Continued)

OTHER PUBLICATIONS

Partial European Search Report and European Search Report for EP 11154989.5, dated Jan. 2013, 17 pages total.
European Search Report for EP12181510.4 dated Sep. 26, 2012, 7 pages total.
Search Report for CN 201010170162.1 dated Oct. 25, 2012, 2 pages total.

*Primary Examiner* — Amr Awad
*Assistant Examiner* — Andre Matthews
(74) *Attorney, Agent, or Firm* — Hamre, Schumann, Mueller & Larson, P.C.

(57) ABSTRACT

A touch panel is presented, which includes a first substrate, a second substrate, and a third substrate. The first substrate includes a first side having a first circuit. The second substrate includes a first side arranged on the first side of the first substrate and a second side having a second circuit. The third substrate is arranged on the second side of the second substrate. Therefore, by using the structure of the touch panel, the substrates of the touch panel can be integrated, so as to achieve the objective of decreasing the overall thickness of an electronic device.

1 Claim, 4 Drawing Sheets

(56) References Cited

U.S. PATENT DOCUMENTS

| | | |
|---|---|---|
| 2009/0160817 A1 | 6/2009 | Wu et al. |
| 2009/0160819 A1 | 6/2009 | Sasaki et al. |
| 2009/0262277 A1* | 10/2009 | Kim .................. G02F 1/133308 349/58 |
| 2009/0278813 A1* | 11/2009 | Wijaya .................... G06F 3/041 345/173 |
| 2010/0006347 A1 | 1/2010 | Yang |
| 2010/0026938 A1 | 2/2010 | Hattori et al. |
| 2010/0164881 A1* | 7/2010 | Kuo ........................ G06F 3/044 345/173 |
| 2011/0109568 A1 | 5/2011 | Wu et al. |

FOREIGN PATENT DOCUMENTS

| | | |
|---|---|---|
| CN | 101539676 | 9/2009 |
| EP | 0887692 | 12/1998 |
| EP | 1936479 | 6/2008 |
| JP | 2008-009750 | 1/2008 |
| TW | 200620078 | 6/2006 |
| TW | M337113 | 7/2008 |
| WO | 2007/146779 | 12/2007 |

\* cited by examiner (a)

(b)

(c)

(d)

(e)

TOUCH PANEL

FIELD OF THE INVENTION

The present invention relates to a touch panel, and more particularly to a capacitive touch panel.

DESCRIPTION OF THE PRIOR ART

In a conventional capacitive touch panel, in addition to liquid crystal and a color filter, at least an extra glass substrate is needed for a touch circuit. Indium tin oxide (ITO) having a strip pattern is provided on two sides of the glass substrate, and the upper and lower layers of the ITO are perpendicularly arranged. A metal wire is formed on a side of the glass substrate. The formation of the ITO electrodes and the metal wire is a key factor that influences the fabrication cost and quality in the process of forming the touch panel.

FIG. 2 shows a conventional method for fabricating a touch circuit in a touch panel. In the conventional method, a circuit is formed by wet-etching. First, a glass substrate formed with ITO on two sides is cleaned. Next, a photoresist is applied onto the ITO on a first side of the substrate. After the processes of pre-baking, exposure, and development of the photoresist, the photoresist is applied onto the entirely of the ITO on a second side of the glass substrate opposite the first side, so as to protect the ITO on the second side of the glass substrate. Subsequently, the glass substrate is immersed in an etchant, so as to remove the undesired ITO on the first side of the substrate. Afterward, the photoresist on the two sides of the substrate is removed, and a first circuit on the first side of the glass substrate is formed.

Next, the method for patterning the ITO on the first side of the glass substrate is repeated to pattern the ITO on the second side of the substrate, so as to form a second circuit on the second side of the substrate.

In the conventional wet-etching process, the steps of applying the photoresist and removing the photoresist need to be performed twice. If liquid crystal or a color filter is already formed on a side of the substrate, the steps of applying the photoresist and immersing in the etchant may cause damage to the liquid crystal or the color filter. Thus, in the conventional method for fabricating the touch panel, the touch circuit and the liquid crystal or the color filter need to be formed on different substrates, which are then combined with the substrate having the touch circuit.

Due to the demands for light, thin, short, and small electronic devices, many hand-held electronic devices are required to be lighter and thinner for easy portability. However, the conventional wet-etching process increases the complexity of integrating the substrates. In conclusion, the conventional wet-etching process of forming the circuit on the glass substrate having the ITO not is only time consuming and labor intensive, but also increases the overall thickness of the electronic device. Therefore, a process capable of integrating the element substrates is urgently needed.

In addition, due to pollution particles possibly existing on each substrate, bubbles may be generated in substrate bonding and an alignment problem of substrate bonding may also occur, which both affect the yield of the fabrication process of the electronic device. Moreover, when the contact area is larger, the bonding complexity will be higher. Therefore, a process structure capable of reducing the number of required substrates in the touch panel is urgently needed.

SUMMARY OF THE INVENTION

In order to effectively reduce the number of substrates in an electronic device, the present invention is directed to a touch panel, in which a touch circuit of the touch panel is integrated onto a cover lens, a substrate of a color filter, or a polarizer, so as to reduce the number of substrates that need to be bonded, thereby effectively avoiding problems caused by substrate bonding and decreasing the overall thickness of the touch panel.

In a first embodiment, the present invention provides a touch panel, which includes a first substrate, a second substrate, and a third substrate. The first substrate includes a first side having a first circuit. The second substrate includes a first side arranged on the first side of the first substrate and a second side having a second circuit. The third substrate is arranged on the second side of the second substrate.

In a second embodiment, the present invention provides a touch panel, which includes a first substrate, a second substrate, and a third substrate. The first substrate includes a first side having a first circuit. The second substrate is arranged on the first side of the first substrate. The third substrate includes another side arranged on a second side of the second substrate, and the first side has a second circuit.

In a third embodiment, the present invention provides a touch panel, which includes a first substrate, a second substrate, and a third substrate. The second substrate includes a first side arranged on the first substrate, and the first side has a first circuit. The third substrate is arranged on a second side of the second substrate, and has a second circuit at a side facing the second substrate.

In a fourth embodiment, the present invention provides a touch panel, which includes a first substrate, a second substrate, and a third substrate. The second substrate is arranged on the first substrate, and a first circuit and a second circuit are respectively provided on two sides of the second substrate. The third substrate is arranged on the second substrate.

In a fifth embodiment, the present invention provides a touch panel, which includes a first substrate and a second substrate. The first substrate includes a first side having a circuit. The second substrate is arranged on the first side of the first substrate.

In a sixth embodiment, the present invention provides a touch panel, which includes a first substrate, a second substrate, and a third substrate. The second substrate is arranged on the first substrate, and a circuit is formed on a side of the second substrate. The third substrate is arranged on the second substrate.

In a seventh embodiment, the present invention provides a touch panel, which includes a first substrate, a second substrate, and a third substrate. The second substrate is arranged on the first substrate. The third substrate is arranged on the second substrate, and a circuit is formed on a side of the third substrate facing the second substrate.

DETAILED DESCRIPTION

Figure 1:
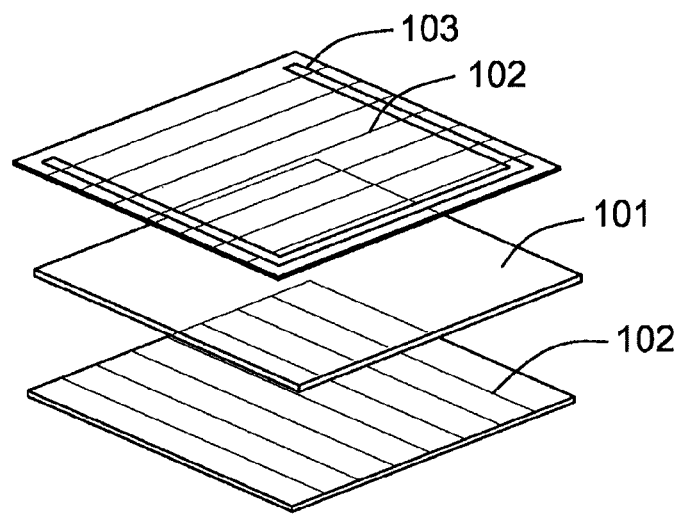
FIG. 1 shows a structure of a conventional touch circuit.
Figure 2:
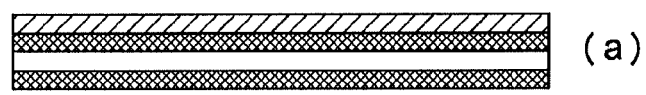
FIG. 2 shows a conventional method for patterning an ITO substrate.
Figure 2:
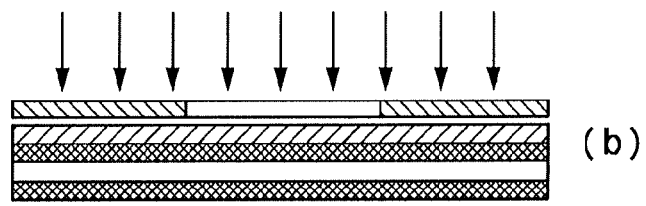
Figure 2:
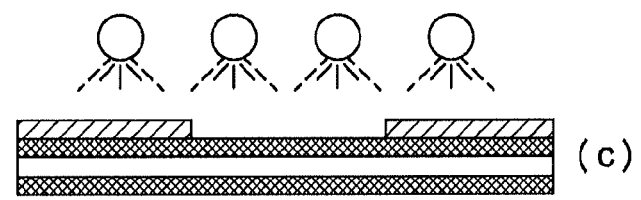
Figure 2:
Figure 2:
Figure 3:
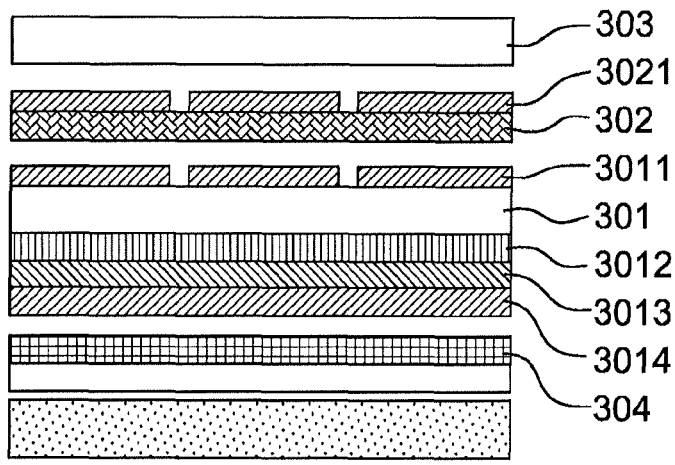
FIG. 3 shows a touch panel according to an embodiment of the present invention.

FIG. 3 shows a structure of a touch panel according to the present invention, which includes a first substrate 301, a second substrate 302, and a third substrate 303. In such a structure, it can be considered that a circuit is formed on a first side of the first substrate 301 facing the second substrate 302, two sides of the second substrate 302, and an inner side of the third substrate 303, that is, a side facing the second substrate.

In an embodiment of the present invention, on the first side of the first substrate 301, a conductive material is jet-printed through a jet-printing process, and unnecessary parts of the jet-printed conductive material are etched away by laser imprinting, so as to form a first circuit 3011 on the first side of the first substrate 301. The second substrate 302 is arranged on the first side of the first substrate, and a second circuit 3021 is formed on a side opposite to the first substrate. The second circuit 3021 may be formed by the same method as the first circuit 3011. The third substrate 303 is arranged on a side of the second substrate 302 formed with the second circuit 3021.

In another embodiment, the first circuit 3011 and the second circuit 3021 may be arranged on different layers, so as to achieve a multi-point touch function.

In addition, in another method for forming the first circuit, ITO is pre-formed on the first side of the first substrate 301, and unnecessary parts of the ITO are etched away by laser imprinting, so as to form the first circuit 3011 on the first side of the first substrate 301. The two dry patterning methods are different from the conventional method for forming the circuit through wet-etching and suitable for integration with other substrates pre-formed with elements.

In an embodiment, the first substrate 301 is already provided with a pre-formed color filter 3012 on a second side opposite the first side, and a planarization resin 3013 and an ITO rear electrode 3014 connected to a lower liquid crystal 304 may even be already pre-formed on an outer side of the color filter 3012. Thus, for the integration of the substrate of the color filter 3012 and the substrate of the first circuit 3011, the first circuit 3011 must be formed through a dry patterning process. If a conventional wet-etching process is adopted to form a circuit on a rear side of the substrate of the color filter 3012, pre-formed elements such as color filter may be damaged. Thus, through the dry patterning process, the substrate of the color filter can be integrated with the substrate on which a circuit is to be formed, so as to effectively reduce the number of required substrates, lower the complexity of substrate bonding, and decrease the overall thickness of the touch panel.

In a preferred embodiment, the first circuit 3011 is a driving circuit of the touch panel and the second circuit 3021 is a sensing circuit. In another embodiment, the second substrate 302 is a polarizer of the touch panel, and the third substrate 303 is a cover lens on a surface of the touch panel which has optical characteristics and serves to the touch elements.

In still another embodiment, the second substrate 302 may be an extra plastic substrate arranged between the polarizer and the cover lens 303, so that the second circuit 3021 can be formed on the plastic substrate by wet-etching or dry patterning.

In addition, a layer of UV film optical glue can be additionally arranged between the second substrate and the third substrate, and the two substrates are bonded in a vacuum manner, so as to avoid problems such as unevenness, voids, alignment errors, or element damage caused in the bonding process of the two substrates, thereby reducing the complexity of substrate bonding.

Figure 4:
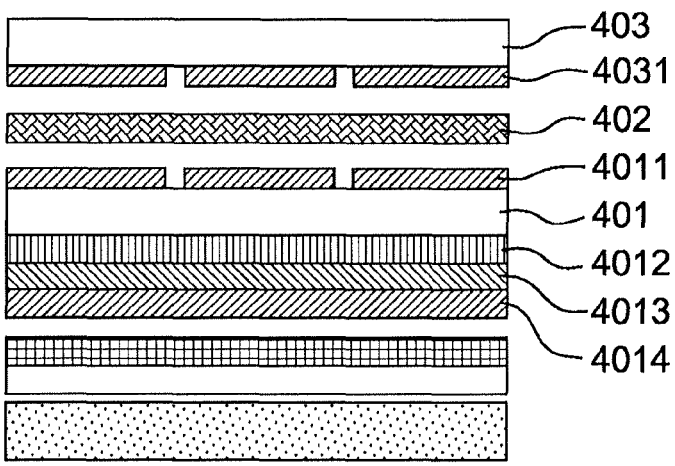
FIG. 4 shows a touch panel according to an embodiment of the present invention.

FIG. 4 shows a structure of another touch panel according to the present invention, which includes a first substrate 401, a second substrate 402, and a third substrate 403. A first circuit 4011 is formed by dry patterning on a first side of the first substrate 401. A second substrate 402 is arranged on the first side of the first substrate 401. A third substrate 403 is further arranged on the second substrate 402. A second circuit 4031 is formed on a side of the third substrate facing the second substrate. The second circuit 4031 is formed by dry patterning.

In a preferred embodiment, the first substrate 401 is already provided with a pre-formed color filter 4012 on a second side opposite to the first side, and a planarization resin 4013 and an ITO rear electrode 4014 may even be already pre-formed on an outer side of the color filter 4012. Thus, through the dry patterning process, the substrate of the color filter can be integrated with the substrate of the first circuit 4011, so as to effectively decrease the overall thickness of the touch panel.

In a preferred embodiment, the first circuit 4012 is a driving circuit of the touch panel and the second circuit 4031 is a sensing circuit. In another embodiment, the second substrate 402 is a polarizer of the touch panel and the third substrate 403 is a cover lens on a surface of the touch panel.

In addition, a layer of UV film optical glue (UV glue) is additionally arranged between the second substrate 402 and the third substrate 403, and the two substrates are bonded in a vacuum manner, so as to reduce the complexity of substrate bonding.

Figure 5:
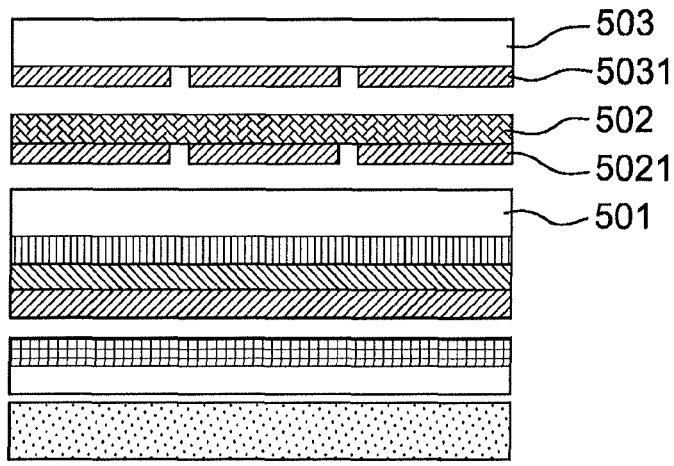
FIG. 5 shows a touch panel according to an embodiment of the present invention.

FIG. 5 shows a structure of another touch panel according to the present invention, which includes a first substrate 501, a second substrate 502, and a third substrate 503. A first circuit 5021 is formed by dry patterning on a first side of the second substrate 502 facing the first substrate 501. A second circuit 5031 is formed on a side of the third substrate 503 facing the second substrate 502. The second circuit 5031 may also be formed by dry patterning.

In a preferred embodiment, the second substrate 502 has a polarizer and the third substrate 503 is a cover lens. Thus, the first circuit 5021 and the second circuit 5031 are formed by dry patterning, so as not to damage the optical characteristics of the polarizer and the cover lens. In this case, the polarizer is integrated with the substrate of the first circuit and the cover lens is integrated with the substrate of the second circuit, so as to effectively decrease the overall thickness of the touch panel.

The first circuit 5021 may be a driving circuit of the touch panel and the second circuit 5031 is a sensing circuit. In another embodiment, the second substrate 502 is an extra plastic substrate arranged between the polarizer and the third substrate 503 (the cover lens).

Moreover, a layer of UV film optical glue is additionally arranged between the second substrate 502 and the third substrate 503, and the two substrates are bonded in a vacuum manner.

Figure 6:
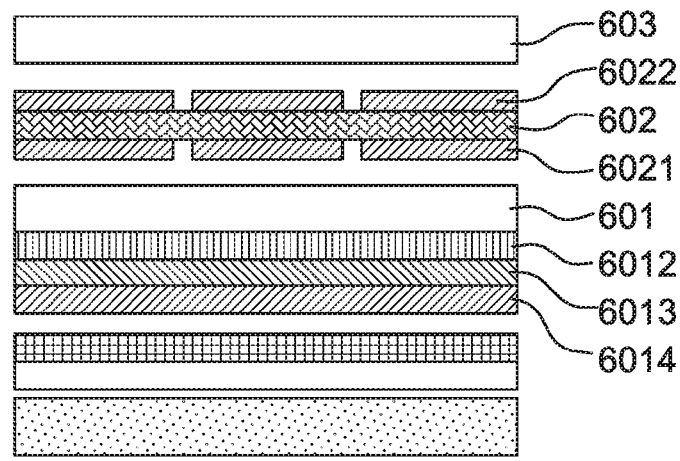
FIG. 6 shows a touch panel according to an embodiment of the present invention.

FIG. 6 shows a structure of another touch panel according to the present invention, which includes a first substrate 601, a second substrate 602, and a third substrate 603. The second substrate 602 is arranged on the first substrate 601. A first circuit 6021 and a second circuit 6022 are respectively formed on two sides of the second substrate 602. A third substrate 603 is arranged on a side of the second substrate 602 opposite to the first substrate 601. In an embodiment, the first substrate 601 is already provided with a pre-formed color filter 6012 on the side opposite the side on which the second substrate 602 is to be arranged. A planarization resin 6013 and an ITO rear electrode 6014 may even be already pre-formed on an outer side of the color filter 6012. In addition, the second substrate 602 may be a color filter. Thus, the formation of the first circuit 6021 and the second circuit 6022 on the two sides of the second substrate 602 through dry patterning will not damage the original color filter. Besides, the circuit substrate with the touch panel can be integrated with the substrate with the color filter, so as to effectively decrease the overall thickness of the touch panel.

In another preferred embodiment, the second substrate 602 may be a plastic substrate, and circuits are formed on two sides of the plastic substrate through dry patterning, so as to enhance the yield of the process. In an embodiment, the first circuit 6021 is a driving circuit of the touch panel and the second circuit 6022 is a sensing circuit. In addition, the third substrate 603 arranged on the second substrate 602 is a cover lens on a surface of the touch panel.

In an embodiment, the present invention further provides a touch panel, which includes a first substrate 701 and a second substrate 703 of the touch panel. The second substrate 703 is arranged on a first side of the first substrate 701, and a circuit 7011 is formed on the first side of the first substrate 701. The circuit 7011 may be formed by dry patterning.

In a preferred embodiment, the second substrate 703 is a cover lens which has optical characteristics and protects the touch circuit.

In a preferred embodiment, the first substrate 701 is already provided with a pre-formed color filter 7012 on a second side opposite the first side, and a planarization resin 7013 and an ITO rear electrode 7014 may even be already pre-formed on an outer side of the color filter 7012. Thus, the substrate of the color filter can be integrated with the substrate of the circuit 7011 through dry patterning, so as to effectively decrease the overall thickness of the touch panel.

In an embodiment, the ITO formed on the first side of the first substrate 701 may be patterned into a strip structure through laser imprinting, so as to form touch patterns arranged in parallel. A jet-printing process is further adopted to jet-print an insulating material and a conductive material on adjacent or parallel touch patterns, so as to conduct the two touch patterns. Finally, the jet-printed insulating material and conductive material are further patterned through laser imprinting, so as to form the circuit 7011. In this embodiment, the single layer touch circuit is single-point touch. In a preferred embodiment, the circuit 7011 includes a driving circuit and a sensing circuit of the touch panel.

Figure 7:
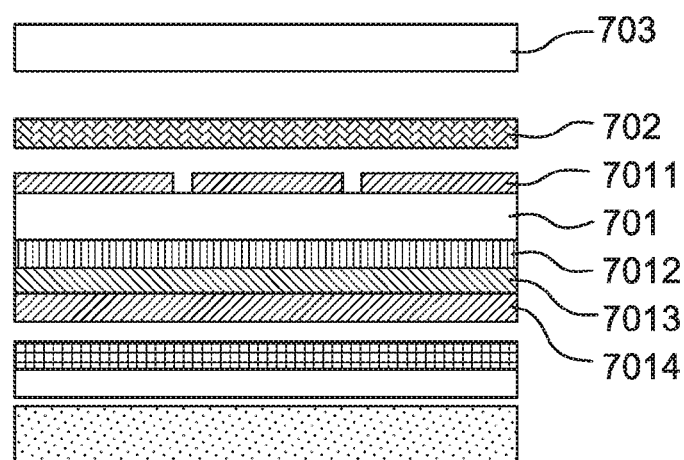
FIG. 7 shows a touch panel according to an embodiment of the present invention.

In another embodiment, as shown in FIG. 7, a third substrate 702 is further provided between the first substrate 701 and the second substrate 703, and is a polarizer of the touch panel.

Figure 8:
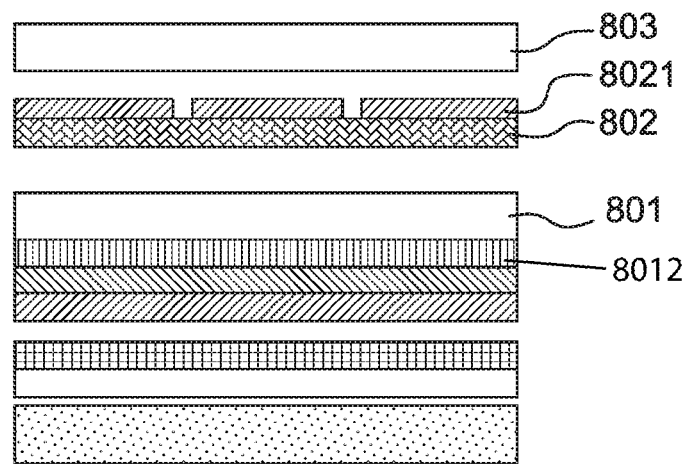
FIG. 8 shows a touch panel according to an embodiment of the present invention.

FIG. 8 shows a structure of another touch panel according to the present invention, which includes a first substrate 801, a second substrate 802, and a third substrate 803 of the touch panel. The second substrate 802 is arranged on a first side of the first substrate 801. The third substrate 803 is arranged on another side of the second substrate 802. A circuit 8021 is formed on a side of the second substrate 802. The circuit is formed through dry patterning. In an embodiment, the first substrate 801 is already provided with a pre-formed color filter 8012 on the second side of the first substrate 801 opposite to the first side of the first substrate.

In a preferred embodiment, the second substrate 802 is a polarizer, the optical characteristics of the polarizer will not be damaged through dry patterning, and the polarizer can be integrated with the circuit 8021, so as to further decrease the overall thickness of the touch panel effectively. The third substrate 803 may be a cover lens on a surface of the touch panel.

In an embodiment, the circuit 8021 includes a driving circuit and a sensing circuit of the touch panel. In addition, a layer of UV film optical glue is additionally arranged between the second substrate 802 and the third substrate 803, and the two substrates are bonded in a vacuum manner.

Figure 9:
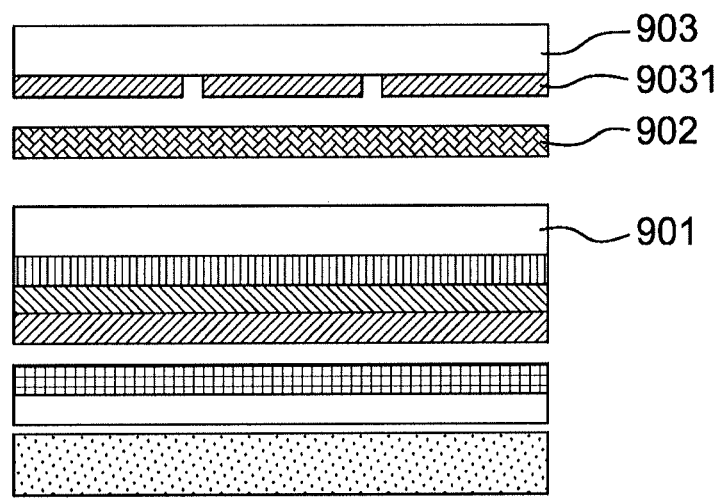
FIG. 9 shows a touch panel according to an embodiment of the present invention.

FIG. 9 shows a structure of another touch panel according to the present invention, which includes a first substrate 901, a second substrate 902, and a third substrate 903. The second substrate 902 is arranged on the first substrate 901, and the third substrate 903 is arranged on the second substrate 902. A circuit 9031 is formed on a side of the third substrate 903 facing the second substrate 902. The circuit is formed by dry patterning.

In a preferred embodiment, the third substrate 903 is a cover lens on a surface of the touch panel. The circuits are formed through dry patterning to avoid damage to the surface of the cover lens caused by the etchant in the conventional wet-etching process, so that the substrate of the circuit 9031 can be integrated with the cover lens, thereby further decreasing the overall thickness of the touch panel effectively.

In addition, the circuit 9031 includes a driving circuit and a sensing circuit of the touch panel. Further, the first substrate 901 may include a color filter and the second substrate 902 may be a polarizer. Moreover, the second substrate 902 and the third substrate 903 may be bonded through UV film optical glue in a vacuum manner.

In the touch panel according to the present invention, the touch circuit of the touch panel can be integrated onto the cover lens, the substrate with the color filter, or the polarizer. Therefore, the number of substrates that need to be bonded is reduced, so that the problems caused during substrate bonding are effectively reduced and the overall thickness of the touch panel is also effectively decreased.

Although the technical solutions and features of the present invention are illustrated as above, persons skilled in the art can still make various variations and modifications without departing from the teachings and disclosure of the present invention. Thus, the scope of the present invention is not limited to the disclosed embodiments but includes other variations and modifications without departing from the present invention, and is as defined by the appended claims.

I claim:

1. A touch panel, comprising;
    a first substrate comprising a first surface and a second surface that are opposite to each other:
    a second substrate being a polarizer that comprises, a first surface arranged on the first surface side of the first substrate, and a second surface, the first surface of the polarizer and the second surface of the polarizer being opposite to each other;

a circuit directly formed on the first surface of the polarizer or the second surface of the polarizer, the circuit comprising a driving circuit and a sensing circuit; and a third substrate arranged on the second surface side of the polarizer; and further comprising a color filter directly formed on the second surface of the first substrate, wherein the third substrate is a cover lens.

\* \* \* \* \*